United States Patent
Lasser

(10) Patent No.: US 10,498,739 B2
(45) Date of Patent: Dec. 3, 2019

(54) SYSTEM AND METHOD FOR SHARING ACCESS RIGHTS OF MULTIPLE USERS IN A COMPUTING SYSTEM

(71) Applicant: COMIGO LTD., Yarkona (IL)

(72) Inventor: Menahem Lasser, Kohav-Yair (IL)

(73) Assignee: Comigo Ltd., Yarkona (IL)

( * ) Notice: Subject to any disclaimer, the term of this patent is extended or adjusted under 35 U.S.C. 154(b) by 244 days.

(21) Appl. No.: 15/345,518

(22) Filed: Nov. 8, 2016

(65) Prior Publication Data
US 2017/0214697 A1    Jul. 27, 2017

Related U.S. Application Data

(60) Provisional application No. 62/281,384, filed on Jan. 21, 2016.

(51) Int. Cl.
*H04L 29/06* (2006.01)
*G06F 21/31* (2013.01)

(52) U.S. Cl.
CPC ............ *H04L 63/102* (2013.01); *G06F 21/31* (2013.01); *H04L 63/104* (2013.01); *G06F 2221/2141* (2013.01)

(58) Field of Classification Search
CPC ..... H04L 63/102; H04L 63/104; G06F 21/31; G06F 2221/2141
See application file for complete search history.

(56) References Cited

U.S. PATENT DOCUMENTS

| | | | |
|---|---|---|---|
| 7,334,018 B2 | 2/2008 | Elms | |
| 8,826,390 B1 | 9/2014 | Varda | |
| 9,009,794 B2 | 4/2015 | Dykeman et al. | |
| 2003/0225764 A1 | 12/2003 | Smith et al. | |
| 2004/0267971 A1* | 12/2004 | Seshadri | G06F 21/31 710/8 |
| 2007/0256124 A1* | 11/2007 | Ih | G06F 21/335 726/9 |
| 2009/0235334 A1* | 9/2009 | Park | G06F 21/6218 726/4 |
| 2010/0242092 A1* | 9/2010 | Harris | H04L 63/08 726/3 |
| 2011/0154210 A1* | 6/2011 | Sung | H04L 63/104 715/736 |
| 2012/0159327 A1 | 6/2012 | Law et al. | |
| 2012/0324550 A1 | 12/2012 | Wasilewski | |
| 2013/0174223 A1* | 7/2013 | Dykeman | G06F 21/10 726/4 |
| 2013/0174273 A1* | 7/2013 | Grab | G06F 21/00 726/28 |
| 2014/0007197 A1 | 1/2014 | Wray | |
| 2015/0143422 A1 | 5/2015 | Moran et al. | |
| 2015/0180983 A1* | 6/2015 | Hitomi | H04L 67/306 709/203 |
| 2016/0036822 A1* | 2/2016 | Kim | H04L 67/1097 726/4 |

* cited by examiner

*Primary Examiner* — Cheng-Feng Huang
(74) *Attorney, Agent, or Firm* — Marc Van Dyke; Fourth Dimension IP

(57) ABSTRACT

Methods and systems for sharing the access rights of multiple users in a computing system, each of the multiple users having corresponding user credentials and corresponding access rights to controlled objects in the computing system, so as to enable a specific user to temporarily access controlled objects for which he does not have access rights, and another user does have access rights.

17 Claims, 4 Drawing Sheets

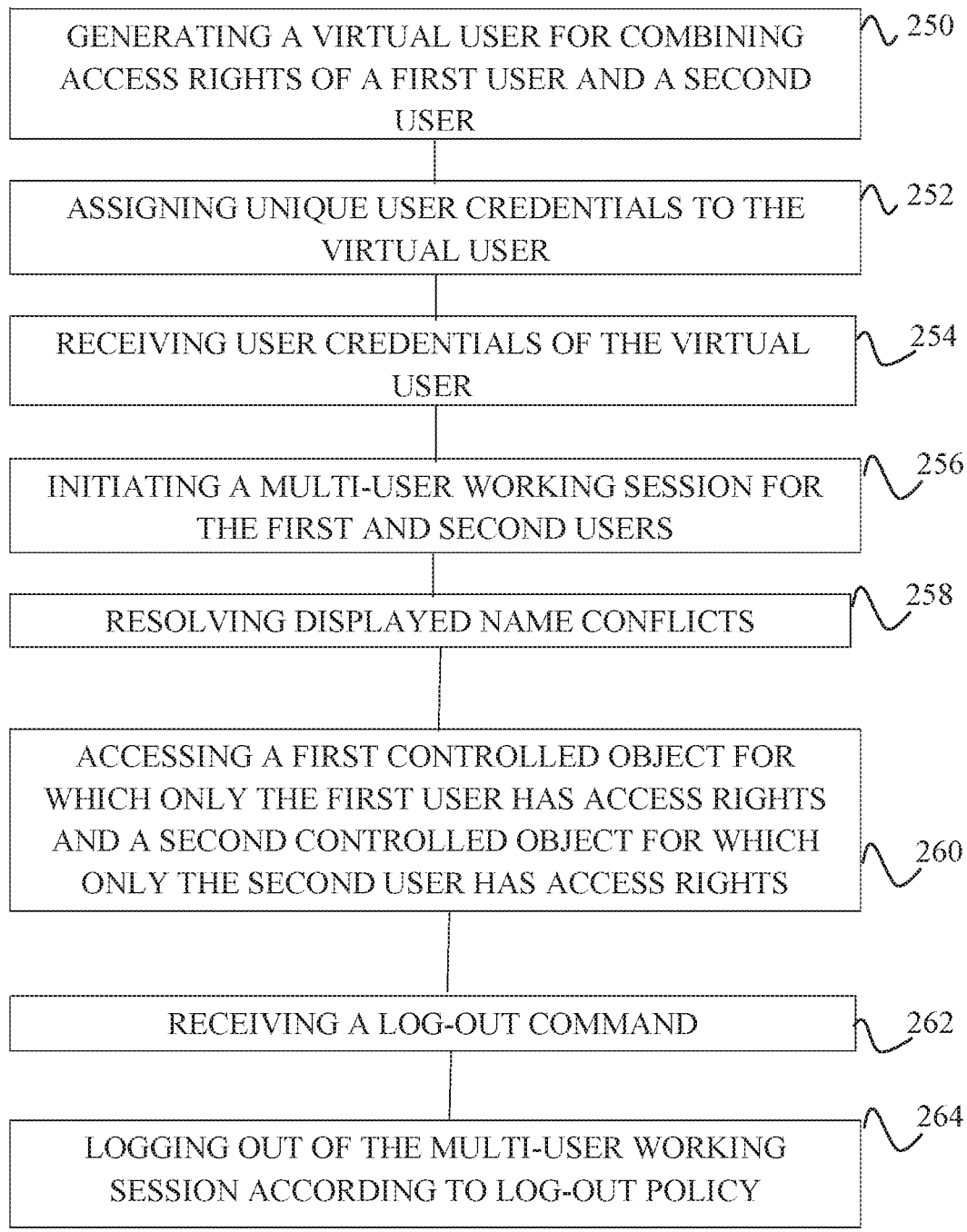

SYSTEM AND METHOD FOR SHARING ACCESS RIGHTS OF MULTIPLE USERS IN A COMPUTING SYSTEM

RELATED APPLICATION

The present application gains priority from U.S. Provisional Patent Application 62/281,384 filed Jan. 21, 2016 and entitled "Sharing Access Rights", which is incorporated herein by reference as if fully set forth herein.

FIELD AND BACKGROUND OF THE INVENTION

The invention, in some embodiments, relates to the field of login processes, and more particularly to methods and system which enable multiple users of a computing system to share access rights to resources in the system.

Users of computing devices such as desktop computers, laptops, terminals, tablets, smartphones, set-top boxes, and other computing devices are familiar with the concept of a "user account". An account establishes a user's right to log into the computing device or into a computing system which includes the specific device. For example a user may log into a laptop to gain access to contents of the laptop, or may use a terminal to log into a system allowing access to a remote computer, for example in a computing network. An account also defines the user's access rights—what files the user is allowed to read, what files he is allowed to write or delete, what resources he is allowed to use, and the like. An account is typically defined by a unique user name accompanied by a user-defined password or other means for authenticating that the person logging in is indeed the user associated with the unique user name.

In a system supporting multiple user accounts, a specific file or resource may be accessible using the access rights of one user and inaccessible using the access rights of another user. For example, in a typical corporate, a first user may have an account giving him access rights to print on a certain network printer, while a second user has an account not giving him that right. At the same time the second user may have access rights enabling him to write to certain files of the organization while the first user does not have such rights.

In many cases, the access rights of the first and second user are required in order to complete a specific task. In such cases, the first and second user must work together, logging in and out of their respective accounts, in order to access the required resources and complete the task. This process can become long and tiresome.

There is thus a need for a system and a method which will enable users having different access rights to a computing system to temporarily share their access rights for the completion of a specific task.

SUMMARY OF THE INVENTION

Some embodiments of the invention relate to login processes, and more particularly to methods and systems which enable multiple users of a computing system to share access rights to resources in the system.

According to an aspect of some embodiments of the invention, there is provided a method for sharing access rights of multiple users in a computing system, each of the multiple user having corresponding user credentials and corresponding access rights to controlled objects in the computing system, the method including the following steps, in order:

a. receiving from a first user user-credentials of the first user thereby logging the first user into the computing system, wherein the receiving initiates a single-user working session during which access rights of the first user are respected;
b. receiving a command instructing the computing system to enable an additional user to interact with the computing system;
c. receiving user-credentials of a second user;
d. in response to receiving the user credentials of the second user, initiating a multi-user working session during which access rights of both the first user and the second user are respected; and
e. prior to termination of the multi-user working session, accessing or using a first controlled object using an access right included in the access rights of the first user and accessing or using a second controlled object using an access right included in the access rights of the second user, wherein the access rights of the second user do not allow accessing or using of the first controlled object and the access rights of the first user do not allow accessing or using of the second controlled object, wherein the accessing or using of the first controlled object and the accessing or using of the second controlled object occur within the multi-user working session.

In some embodiments, receiving the user-credentials of the first user and receiving the user credentials of the second user occur via a single terminal of the computing system. In some embodiments, receiving the user-credentials of the first user and receiving the user credentials of the second user occur via a single user-input device of the single terminal.

In some embodiments, receiving the user-credentials of the first user occurs via a first terminal of the computing system, and receiving the user credentials of the second user occurs via a second terminal of the computing system, the second terminal being different from the first terminal.

In some embodiments the method further includes, during the multi-user working session, receiving a second command instructing the computing system to enable a second additional user to interact with the computing system, receiving user-credentials of a third user, and in response to receiving the credentials of the third user, adding to the multi-user working session access rights of the third user, such that the access rights of the first, second, and third users are all respected during the multi-user working session.

In some embodiments, the method further includes, during the multi-user working session, receiving identification of a specific user in the multi-user working session, and removing the access rights of the specific user from the multi-user working session, while maintaining the multi-user working session active.

In some embodiments, the method further includes, during the multi-user working session, receiving a log-out command, and following receipt of the log-out command, terminating the multi-user working session.

In some embodiments, terminating the multi-user working session further includes terminating the single-user working session.

In some embodiments, the log-out command includes an identification of the first user or of the second user. In some embodiments, if the identification is an identification of the second user, terminating the multi-user working session maintains the single-user working session active, and if the identification is an identification of the first user, terminating the multi-user working session also terminates the single user working session.

In some embodiments, if the identification is an identification of the second user, terminating the multi-user working session maintains the single-user working session active, and if the identification is an identification of the first user, terminating the multi-user working session terminates the single user working session of the first user and initiates a second single user working session of the second user.

In some embodiments, the method further includes, during the multi-user working session, if a name displayed to the first user for a first controlled object accessible using access rights of the first user in a first single-user working session of the first user is identical to a name displayed to the second user for a second controlled object accessible using access rights of the second user in a second single-user working sessions of the second user, during the multi-user working session displaying a first name for the first controlled object and a second name for the second controlled object, the first and second names being different from each other.

According to another aspect of some embodiments of the invention, there is provided a method for sharing access rights of multiple users in a computing system supporting access by a plurality of users each having corresponding user credentials, the method including the following steps, in order:

a. defining a virtual user that combines the access rights of at least a first user of the plurality of users and a second user of the plurality of users, the defining including assigning to the virtual user unique user credentials different from the user credentials of any user of the plurality of users;

b. receiving the user credentials assigned to the virtual user, thereby logging the virtual user into the computing system;

c. initiating a multi-user working session during which access rights of both the first user and the second user are respected; and d. prior to termination of the multi-user working session, accessing or using a first controlled object using an access right included in the access rights of the first user and accessing or using a second controlled object using an access right included in the access rights of the second user, wherein the access rights of the second user do not allow accessing or using of the first controlled object and the access rights of the first user do not allow accessing or using of the second controlled object, wherein the accessing or using of the first controlled object and the accessing or using of the second controlled object occur within the multi-user working session.

In some embodiments, defining further includes receiving user credentials of the first user and receiving user credentials of the second user. In some embodiments, defining is carried out by an administrator of the computing system. In some embodiments, defining is carried out using a single terminal of the computing system. In some embodiments, defining is carried out using a single user input device of the single terminal.

In some embodiments, the virtual user combines the access rights of at least three users, wherein the defining includes receiving user credentials for each of the at least three users, and wherein the initiating includes initiating the multi-user working session such that the access rights of each of the at least three users are respected.

In some embodiments, the method further includes, during the multi-user working session, if a name displayed to the first user for a first controlled object accessible using access rights of the first user in a first single-user working session of the first user is identical to a name displayed to the second user for a second controlled object accessible using access rights of the second user in a second single-user working session of the second user, during the multi-user working session displaying a first name for the first controlled object and a second name for the second controlled object, the first and second names being different from each other.

In some embodiments, the method further includes, during the multi-user working session, receiving a log-out command, and following receipt of the log-out command, terminating the multi-user working session.

According to yet another aspect of some embodiments of the invention, there is provided a computing system in which access rights of multiple users can be shared, each of the multiple users having corresponding user credentials and corresponding access rights to controlled objects in the computing system, the computing system including:

a. a processor; and b. a non-transitory computer readable storage medium for instructions execution by the processor, the non-transitory computer storage medium having stored instructions to be carried out in order, the instructions including:

i. instructions to receive from a first user user-credentials of the first user thereby to log the first user into the computing system and to initiate a single-user working session during which access rights of the first user are respected;

ii. instructions to receive a command instructing the computing system to enable an additional user to interact with the computing system;

iii. instruction to receive user-credentials of a second user;

iv. instructions to initiate, in response to receipt of the user credentials of the second user, a multi-user working session during which access rights of both the first user and the second user are respected; and v. instructions to be carried out during the multi-user working session, to access or use a first controlled object using an access right included in the access rights of the first user and to access or use a second controlled object using an access right included in the access rights of the second user, wherein the access rights of the second user do not allow accessing or using of the first controlled object and the access rights of the first user do not allow accessing or using of the second controlled object.

In some embodiments, the computing system further includes a single terminal, via which the user credentials of the first user and of the second user are received.

In some embodiments, the computing system further includes a single user-input device of the single terminal, via which the user credentials of the first user and of the second user are received.

In some embodiments, the computing system further includes a first terminal and a second terminal, such that the user credentials of the first user are received via the first terminal and the user credentials of the second user are received via the second terminal.

In some embodiments, the non-transitory computer readable storage medium further has stored instructions to be carried out during the multi-user working session, the instructions including instructions to receive a second command instructing the computing system to enable a second additional user to interact with the computing system, instructions to receive user-credentials of a third user, and instructions to add to the multi-user working session, in response to receiving the credentials of the third user, access rights of the third user, such that the access rights of the first, second, and third users are all respected during the multi-user working session.

In some embodiments, the non-transitory computer readable storage medium further has stored instructions to be carried out during the multi-user working session, the instructions including instructions to receive an identification of a specific user in the multi-user working session, and instructions to remove access rights of the specific user from the multi-user working session, while maintaining the multi-user working session active.

In some embodiments, the non-transitory computer readable storage medium further has stored instructions to be carried out during the multi-user working session, the instructions including instructions to receive a log-out command, and instructions to terminate the multi-user working session, following receipt of the log-out command.

In some embodiments, the instructions to terminate the multi-user working session further include instructions to terminate the single-user working session.

In some embodiments, the log-out command includes an identification of the first user or of the second user.

In some embodiments, the instructions to terminate the multi-user working session include first instructions such that, if the identification is an identification of the second user, the first instructions terminate the multi-user working session and maintain the single-user working session active, and the instructions to terminate the multi-user working session further include second instructions such that, if the identification is an identification of the first user, the second instructions terminate the multi-user working session and also terminate the single user working session.

In some embodiments, the instructions to terminate the multi-user working session include first instructions such that, if the identification is an identification of the second user, the first instructions terminate the multi-user working session and maintain the single-user working session active, and the instructions to terminate the multi-user working session further include second instructions such that, if the identification is an identification of the first user, the second instructions terminate the multi-user working session, terminate the single user working session of the first user, and initiate a second single user working session of the second user.

In some embodiments, the non-transitory computer readable storage medium further has stored additional instructions to be carried out during the multi-user working session, the additional instructions being such that, if a name displayed to the first user for a first controlled object accessible using access rights of the first user in a first single-user working session of the first user is identical to a name displayed to the second user for a second controlled object accessible using access rights of the second user in a second single-user working sessions of the second user, the additional instructions display a first name for the first controlled object and a second name for the second controlled object, the first and second names being different from each other.

According to an aspect of some embodiments of the invention, there is provided a computing system in which access rights of multiple users can be shared, each of the multiple users being part of a plurality of users each having corresponding user credentials, the computing system including:
   a. a processor; and
   b. a non-transitory computer readable storage medium for instructions execution by the processor, the non-transitory computer storage medium having stored instructions to be carried out in order, the instructions including:
      i. instructions to define a virtual user that combines the access rights of at least a first user of the plurality of users and a second user of the plurality of users, and to assign to the virtual user unique user credentials different from the user credentials of any user of the plurality of users;
      ii. instructions to receive the user credentials assigned to the virtual user, thereby to log the virtual user into the computing system;
      iii. instructions to initiate a multi-user working session during which access rights of both the first user and the second user are respected; and
      iv. instructions to be carried out during the multi-user working session, to access or use a first controlled object using an access right included in the access rights of the first user and to access or use a second controlled object using an access right included in the access rights of the second user, wherein the access rights of the second user do not allow accessing or using of the first controlled object and the access rights of the first user do not allow accessing or using of the second controlled object.

In some embodiments, the instructions to define further include instructions to receive user credentials of the first user and to receive user credentials of the second user. In some embodiments, the instructions to define include instructions to define a virtual user that combines at least three users and to receive user credentials for each of the at least three users and wherein the instructions to initiate include instructions to initiate the multi-user working session such that the access rights of each of the at least three users are respected.

In some embodiments, the non-transitory computer readable storage medium further has stored additional instructions to be carried out during the multi-user working session, the additional instructions being such that, if a name displayed to the first user for a first controlled object accessible using access rights of the first user in a first single-user working session of the first user is identical to a name displayed to the second user for a second controlled object accessible using access rights of the second user in a second single-user working sessions of the second user, the additional instructions display a first name for the first controlled object and a second name for the second controlled object, the first and second names being different from each other.

In some embodiments, the non-transitory computer readable storage medium further has stored instructions to be carried out during the multi-user working session, the instructions including instructions to receive a log-out command, and instructions to terminate the multi-user working session, following receipt of the log-out command.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIGS. 2A and 2B are flow charts of two embodiments of methods for sharing access rights of multiple users of a computing system according to embodiments of the teachings herein, wherein the method of FIG. 2A uses the system of FIG. 1A and the method of FIG. 2B uses the system of FIG. 1B.

DESCRIPTION OF SOME EMBODIMENTS OF THE INVENTION

Figure 1A:
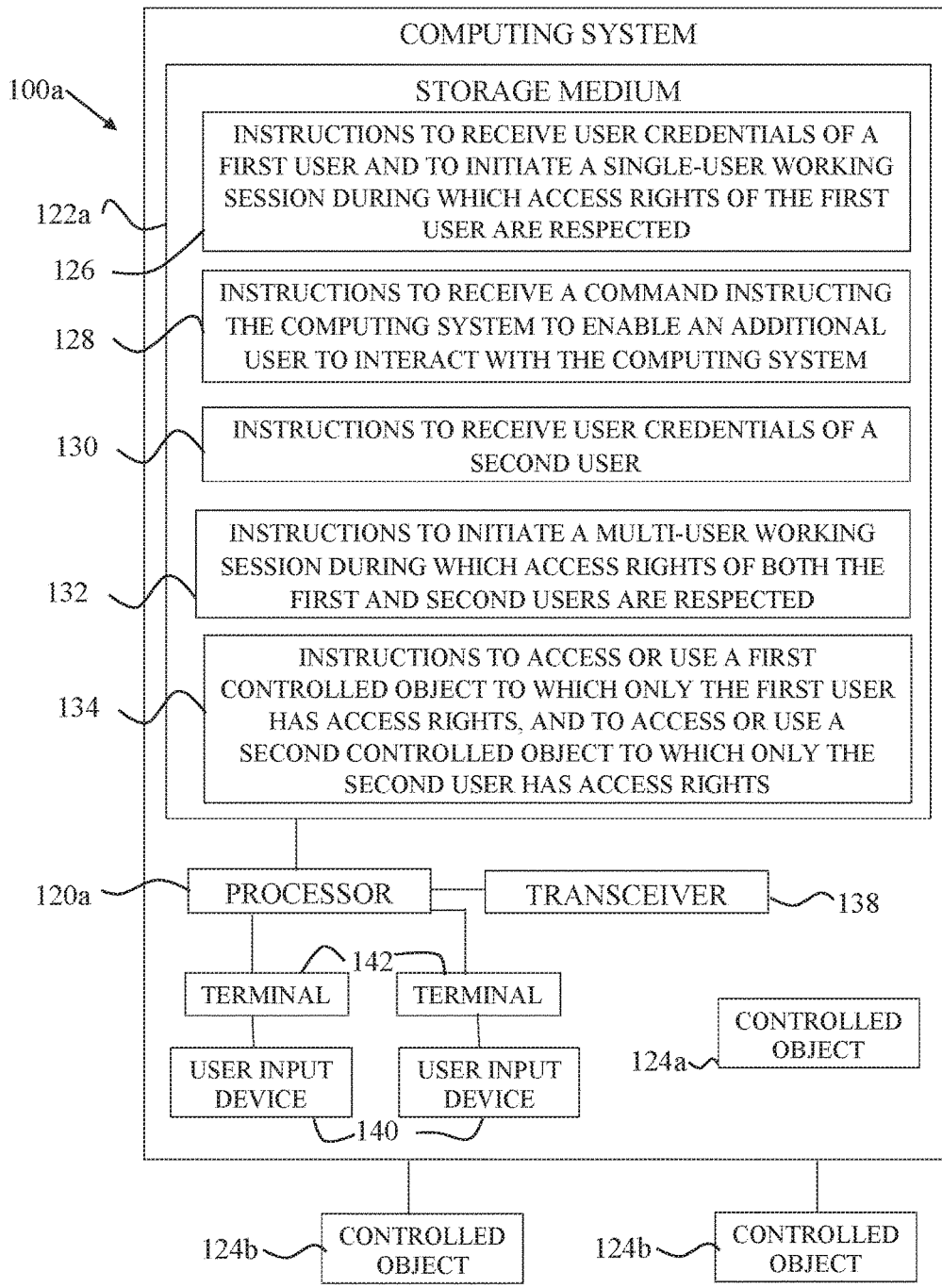
FIGS. 1A and 1B are schematic block diagrams of two embodiments of computing systems in which access rights of multiple users can be shared according to embodiments of the teachings herein.

The invention, in some embodiments, relates to the field of login processes, and more particularly to methods and system which enable multiple users of a computing system to share access rights to resources in the system.

It is a goal of the present invention to allow two users in a computing system, having different access rights, to temporarily share their access rights, for example for the completion of a specific task.

In an exemplary scenario, a first user may have an account giving him access rights to print on a certain network printer, while a second user has an account not giving him that right. At the same time the second user may have access rights enabling him to write to certain files of the organization while the first user does not have such rights. Suppose that the first user is assigned a task of editing a specific one of these files and then printing a hard copy of the file for presenting it to his superiors. Because the first user does not have access rights for editing the file, the second user is assigned to help the first user complete the assigned task. In such a scenario, an exemplary sequence of events may be:

a. The first user is assigned the task, and logs in to the corporate system using his user account and user credentials.

b. The first user works on a previous task having a higher priority.

c. After finishing the previous task, the first user begins working on the newly assigned task, realizes he cannot access the specific file to be edited, and calls the second user over for help.

d. The second user comes to the first user's desk in order to help.

e. The first user logs out of his account.

f. The second user logs in to the corporate system using his user account and user credentials.

g. The two users work together to edit the specific file.

h. Once editing of the specific file has been completed, the first user wants to print the file, but cannot do so from the second user's account.

i. The second user logs out of his account (or the first user does it for him, as no password is required for logging out).

j. The first user logs in to his account.

k. The first user prints the file and delivers it to his superior, and may then log out.

As seen, in this simple scenario, three separate log-in and log-out operations were required. It is easy to imagine much more complex situations, in which more than two controlled objects and more than two users are involved, and in which the number of log-in and log-out operations would be significantly greater.

As is well known to users of computing systems, logging into a system can be a tiresome operation, as the user has to enter their user name as well as user credentials. The user credentials may include a password which may be long and difficult to remember, a one-time-password (OTP) that needs to be obtained using a specific tool and entered within a predetermined time limit, and/or providing biometric information which may require various operations such as providing a finger print, a hand print, undergoing iris scanning, or providing a voice note for voice recognition purposes. Logging out of a system is typically simpler, but can still become a burden if required frequently. As such, the need for so many log-in and log-out operations in order to complete a simple task, the likes of which are common in the corporate world, is a severe inconvenience for most users.

Prior art systems have proposed a solution to this problem, employing a procedure in which multiple users may take part in a joint session, but all the users taking part in the joint session must log-in at the same time by successively inputting their corresponding user credentials in the same command steps or in successive steps of the same command. In some such prior art solutions, the system identifies that two users having different access rights are attempting to access content on the same device, and creates a combined user profile having attributes and access rights based at least partially on the access rights of the two users.

However, such prior art methods require the two users to be accessing media content on the same device at the same time, and would not suit the exemplary situation described above, in which one user has already logged in, and wants to temporarily receive the access rights of another user in order to complete a task.

By contrast, as will be described in detail hereinbelow, the present invention provides methods and systems by which the access rights of two users can be respected, without requiring both users to log into the system at the same time, or to work from a single device, as required in prior art methods, and additional users can be invited to a multi-user session at any time convenient for the user initiating the multi-user working session.

As will be explained in further detail hereinbelow, the present invention provides the user with a method for forming a multi-user working session, such that during the multi-user working session the system behaves as if a "virtual account" is currently logged in, the virtual account having access rights that are the union of the access rights of the original user and the added user. In other words, the user can invite other users to his working sessions such that during the multi-user working session the access rights of all the users participating in the multi-user working session are merged for the duration of the multi-user working session, until an explicit instruction is provided for terminating the multi-user working session.

Referring back to the exemplary scenario described above, using the present invention, the sequence of events would be:

a. The first user is assigned the task, and logs in to the corporate system using his user account and user credentials.
b. The first user works on a previous task having a higher priority.
c. After finishing the previous task, the first user begins working on the newly assigned task, realizes he cannot access the specific file to be edited, and calls the second user over for help.
d. The first user adds the second user to the current session by entering the user credentials of the second user, thereby initiating a multi-user working session.
e. The two users work together to edit the specific file.
f. The first user prints the file and delivers it to his superior, then logs-out and thus ends the multi-user working session.

Clearly, a smaller number of log-in and log-out operations is required when using the present invention as compared to the prior art, while achieving the same result.

As described hereinbelow, and as will be appreciated by one of skill in the art, more than one user may be added to a single-user working session for creating the multi-user working session, such that the effective access rights during the multi-user working session is a union of the access rights of the first user with the access rights of all the invited users.

In the context of the present application, the term "computing system" relates to any device, system or network having computing power and usable by users. For example, the computing system may be a standalone computing device, such as a desktop computer, a laptop computer, a set-top box, a tablet, or a smartphone. As another example, the computing system may include a central computing device or server, interconnected with one or more terminals and/or additional computing devices and accessible by a user through the terminals and/or computing devices. In some cases, the central computing device, terminals, and additional computing devices may all be near one another, forming a Local Area Network (LAN). In other cases, at least some of the central computing device, terminals, and additional computing devices may be remote from one another, forming (part of) a Wide Area Network (WAN)—for example, the central computing device may be a cloud based server, located remotely from the terminals and additional computing devices.

In the context of the present application, the term "terminal" relates to a computing device with which a user may interact, for example via an associated user input device. For example, a terminal may be a standalone computing device such as a desktop computer, laptop computer, a tablet, or a smartphone. As another example, the terminal may be a computing device forming part of a network, such as a user-node of a network. In some cases, the terminal may include logic components and/or computing power. In other cases, the terminal may be used only for the purpose of providing user input to a central computer, and/or of providing output to the user.

In the context of the present application, the term "controlled object" relates to a resource in a computing system, access or use of which is controlled by the computing system, such that only an authorized user can access or use the resource. A controlled object may be a file, a folder containing files or other folders, a peripheral device such a printer or a scanner, or a specific computing device within a computing system, such as a specific server or node within a network.

In the context of the present application, the term "access right" relates to a right of a specific user to carry out one or more specific operations on or with a specific controlled object of a computing system. Examples of operations for which access rights may be provided with respect to files or folders include read, write, edit, and delete. Examples of operations for which access rights may be provided with respect to peripheral devices include print, scan, transmit data, and receive data.

In the context of the present application, the term "user credentials" relates to any user-specific information used by a computing system to identify a user. User credentials may include a password, an OTP, biometric data, and a response to a specific challenge presented by the computing system.

In the context of the present application, the term "user input device" relates to any device capable of receiving input from a user, such as a keyboard, a mouse, a touchpad, a touchscreen, a biometric scanner, and the like.

In the context of the present application, the term "multi-user working session" relates to a period of time during which a single user is allowed to interact with a computing system according to the combined access rights of all of the multiple users which are involved with the multi-user working session. A multi-user working session may be embedded within the time period of a single-user working session.

In the context of the present application, the term "single-user working session" relates to a period of time during which a single user is allowed to interact with a computing system according to the access rights of the single user. A single-user working session is initiated by providing user credentials of the single user to the computing system. The user credentials are typically provided in a log-in operation. A single-user working session is terminated by a log-out operation. A single-user working session may contain within its time period one or more multi-user working sessions. More specifically, if a user that is engaged in a single-user working session initiates a multi-user working session, the single-user working session is considered to continue to be active during the time the multi-user working session is active. In such a case, when the multi-user working session is terminated, the single-user working session may also be terminated or may continue to be active, depending on the implementation logic.

In the context of the present application, the term "working session" relates to a single-user working session or a multi-user working session.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Figure 1B:
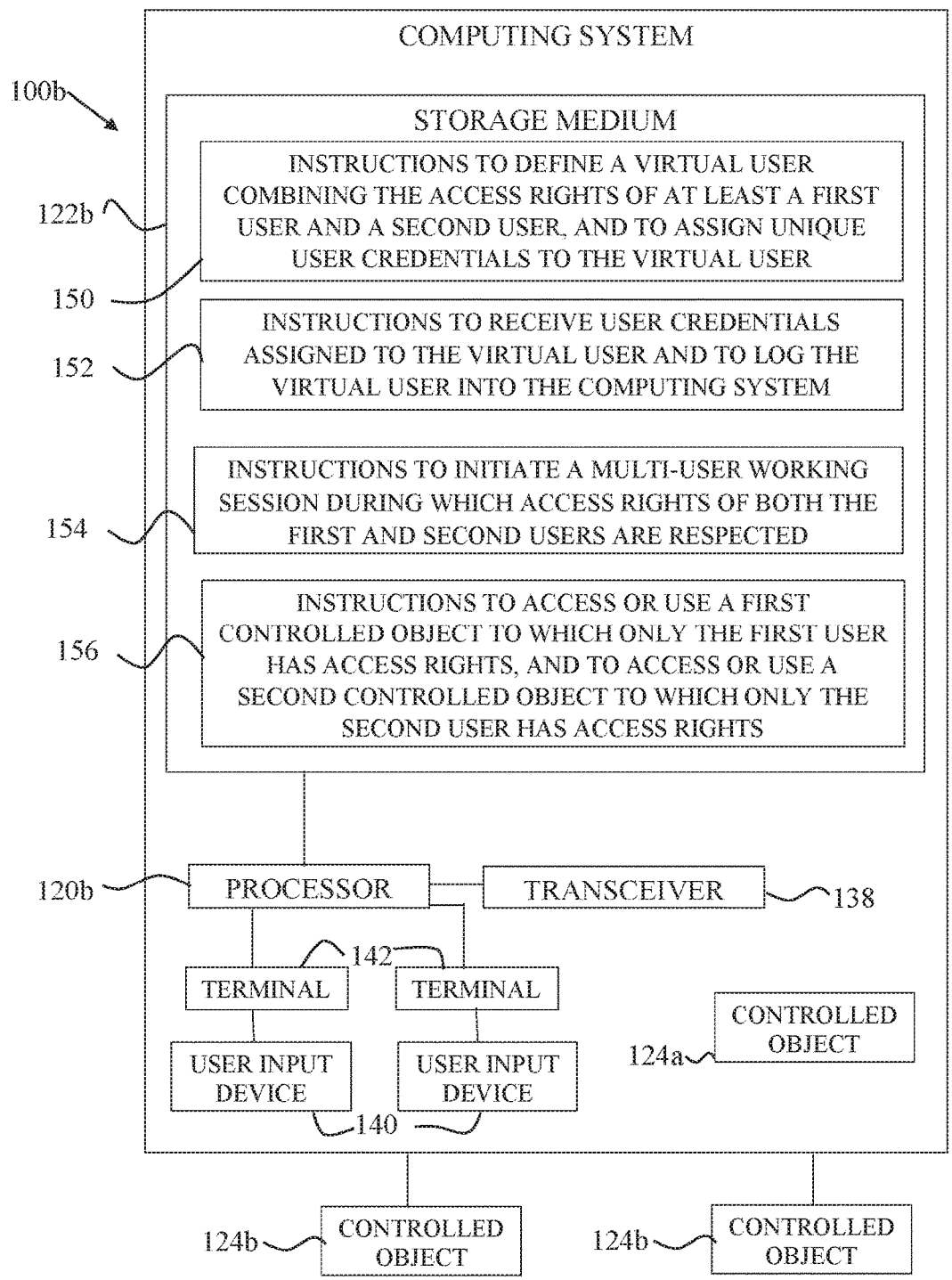

Reference is now made to FIGS. 1A and 1B, which are schematic block diagrams of two embodiments of computing systems in which access rights of multiple users can be shared according to embodiments of the teachings herein.

As seen in FIG. 1A, a computing system 100a in which access rights of multiple users can be shared, includes a processor 120a and a storage medium 122a, which is typically a non-transitory computer readable storage medium. Computing system 100a further includes, or is associated with, multiple controlled objects, such as files and/or file folders 124a, which may be stored in a storage medium (either storage medium 122a or another storage medium not shown), or peripheral devices 124b such as printers, scanners, and the like.

The storage medium 122a includes instructions to be executed by the processor 120a, in order to carry out various steps of the method described herein, as described in further detail hereinbelow. Specifically, the storage medium includes at least the following instructions, to be carried out in order:

instructions 126 to receive from a first user user-credentials of the first user, thereby to log the first user into computing system 100a and to initiate a single-user working session during which access rights of the first user are respected;

instructions 128 to receive a command instructing the computing system 100a to enable an additional user to interact with the computing system;

instructions 130 to receive user-credentials of a second user;

instructions 132 to initiate, in response to receipt of the user credentials of the second user, a multi-user working session during which access rights of both the first user and the second user are respected; and instructions 134, to be carried out during the multi-user working session, to access or use a first controlled object using an access right included in the access rights of the first user and to access or use a second controlled object using an access right included in the access rights of the second user, wherein the access rights of the second user do not allow accessing or using of the first controlled object and the access rights of the first user do not allow accessing or using of the second controlled object.

Processor 120a may, in some embodiments, further be associated with a communication component, such as a transceiver 138, for communication with at least one remote or networked device. In some embodiments, the transceiver 138 may be adapted for communication with a remote or networked controlled object 124b, such as a remote or networked printer, or a remote or networked computing device or server housing files and/or file folders.

It will be appreciated by people of skill in the art that in some embodiments, processor 120a comprises multiple distributed processors, each of which carries out some of the instructions 126 to 134. In some such embodiments, storage medium 122a is also distributed, such that each specific processor may be functionally associated with a storage medium storing the specific instructions to be carried out by that specific processor. For example, a first processor, functionally associated with a first storage medium, may form part of a user terminal in a network, and a second processor functionally associated with a second storage medium may form part of a central server of the network. Receipt of user credentials, verification of the received credentials, and the command to enable interaction with another user, may be carried out by the first processor, in accordance with instructions (126, 128, and 130) included in the first storage medium. Once the users have been verified, the first processor may communicate to the second processor the identities of the verified users, and the second processor may initiate the multi-user working session and control access to controlled objects during the multi-user working session in accordance with instructions (132, 134) included in the second storage medium. Although such embodiments, including distributed processors functioning as processor 120a and/or distributed storage mediums functioning as storage medium 122a, are not illustrated in FIG. 1A, they are nevertheless considered within the scope of the invention.

In some embodiments, processor 120a may be associated with one or more user input devices 140, which may form part of, or be peripheral to, one or more terminals 142 included in or functionally associated with computing system 100a.

The user input device(s) 140 are adapted to receive, and to provide to processor 120a:

user-credentials of the first user required to implement instructions 126;

a command required to implement instructions 128;

user-credentials of a second user required to implement instructions 130;

user identification of specific controlled objects to be accessed by the user; and log-out commands from the first user or from the second user, as described hereinbelow.

In some embodiments, the computing system 100a comprises a localized and specific computing device, such as a desktop computer, laptop computer, or tablet computer. In such embodiments, the processor 120a is local to the specific computing device, and the user input device(s) 140 may be integrated into the specific computing device, such as an integrated touchpad or touchscreen, or may be peripheral components of the specific computing device, such as a peripheral mouse, keyboard, and the like.

In other embodiments, the computing system 100a forms part of a distributed or networked system, such that user input device(s) 140 and/or terminal(s) 142 may be remote from processor 120a. For example, computing system 100a may include a central computing device which may be Cloud based, or may be a networked server or other networked computing device. The central computing device may communicate with remote user input device(s) 140 and/or with terminal(s) 142 associated therewith for receipt of the user credentials and instructions as described hereinabove, for example via transceiver 138.

Turning to FIG. 1B, it is seen that a computing system 100b thereof is substantially similar to computing system 100a of FIG. 1A, with slight differences as described herein. As such, the reference numerals of FIG. 1B correspond to those of FIG. 1A.

Computing system 100b includes a processor 120b substantially as described hereinabove with respect to FIG. 1A. Like computing system 100a of FIG. 1A, computing system 100b includes or is associated with multiple controlled objects, such as files and/or file folders 124a, or peripheral devices 124b, as described hereinabove with respect to FIG. 1A. In some embodiments, processor 120b and/or transceiver 138 may be associated with one or more user input devices 140, which may form part of, or be peripheral to, one or more terminals 142 functionally associated with computing system 100b.

As explained hereinabove, in some embodiments, computing system 100b may comprise a stand-alone computing device, such as a laptop computer or a tablet, in which case user input device(s) 140 and/or terminal(s) 142 may be integrated in, or peripheral to, the computing system 100b. In other embodiments, computing system 100b may be part of a distributed or networked system, such that user input device(s) 140 and/or terminal(s) 142 may be remote from processor 120b and may communicate with the processor via transceiver 138.

The instructions stored in the storage medium 122b are different from those stored in storage medium 122a. Specifically, the storage medium includes at least the following instructions, to be carried out in order:

instructions 150 to define a virtual user that combines the access rights of at least a first user of a plurality of users and a second user of the plurality of users, and to assign to the virtual user unique user credentials different from user credentials of any user of the plurality of users;

instructions 152 to receive the user credentials assigned to the virtual user, thereby to log the virtual user into computing system 100b;

instructions 154 to initiate a multi-user working session during which access rights of both the first user and the second user are respected; and instructions 156, to be carried out during the multi-user working session, to access or use a first controlled object using an access right included in the access rights of the first user and to access or use a second controlled object using an access right included in the access rights of the second user, wherein the access rights of the second user do not allow accessing or using of the first controlled object and the access rights of the first user do not allow accessing or using of the second controlled object.

As discussed hereinabove with reference to FIG. 1A, the processor 120b may comprise multiple distributed processors, each carrying out some of the instructions 150 to 156. Storage medium 122b may also comprise multiple distributed storage mediums, for example a storage medium functionally associated with each of the distributed processors and including the specific instructions to be carried out by the associated processor.

Figure 2A:
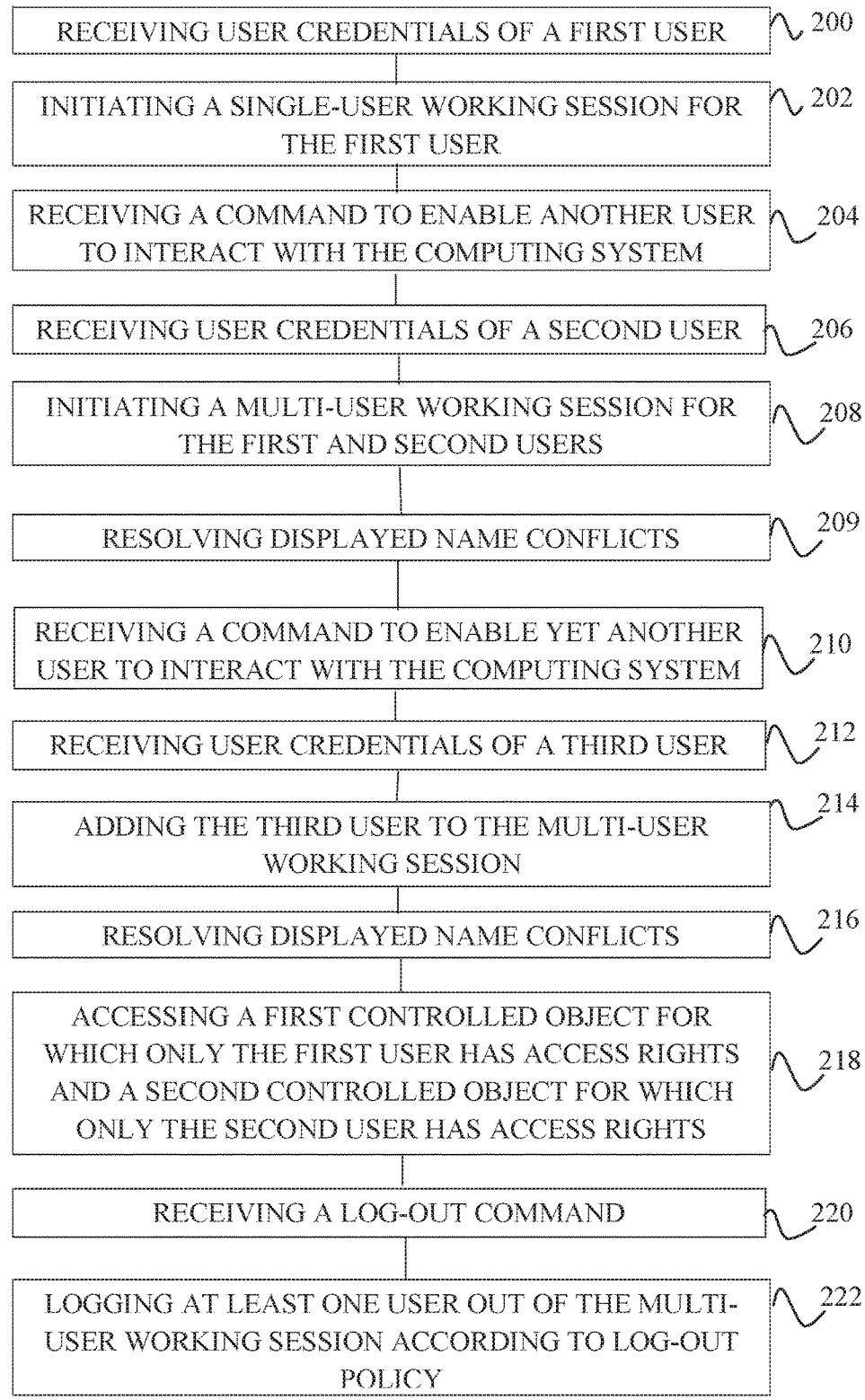

Reference is now additionally made to FIGS. 2A and 2B, which are flow charts of two embodiments of methods for sharing access rights of multiple users of a computing system according to embodiments of the teachings herein, wherein the method of FIG. 2A uses the computing system 100a of FIG. 1A and the method of FIG. 2B uses the computing system 100b of FIG. 1B.

Turning to FIG. 2A, it is seen that in a first step, indicated by reference numeral 200, the user credentials of a first user are received, typically from a user input device 140 associated with a terminal 142. In some embodiments, the terminal 142 is located near the processor 120a, and the input user credentials are received directly, whereas in other embodiments the terminal 142 may be networked to the processor 120a, and the user credentials are received via transceiver 138, as described hereinabove with respect to FIG. 1A.

The received user credentials may include a user-name or other user identifier, as well as a mechanism for authenticating the user, such as a password, OTP, biometric data of the user, and the like.

At step 202, the computing system 100a logs in the first user for whom user credentials were received, and initiates a single-user working session for the first user. During this single user working session, only the access rights of the first user are respected.

At some point subsequently to initiation of the single-user working session, computing system 100a receives a command to enable another user to interact with the computing system, as seen at step 204. In some embodiments, the command may be a "Join User", "Add User", or "Invite User" command, and may be activated at any point in time during the single-user working session, even after working in the single-user working session for a while. In some embodiments, the command may generate or cause presentation of a prompt for entering user credentials of the user being added.

As seen at step 206, in response to receipt of the command, and, where relevant, generation of a prompt for entering user credentials of a second user, user credentials for the second user are received. The received user credentials may include a user-name or other user identifier, as well as a mechanism for authenticating the user, such as a password, OTP, biometric data of the user, and the like.

Similarly to receipt of the user credentials of the first user, the user credentials of the second user are typically received from a user input device 140 associated with a terminal 142. In some embodiments, though not necessarily, the user credentials of the second user may be received from the same terminal 142 as the user credentials of the first user. In some embodiments, though not necessarily, the user credentials of the second user may be received from the same user input device 140 as the user credentials of the first user.

Following receipt of the user credentials of the second user, at step 208 computing system 100a initiates a multi-user working session including the first and second users, and combining the access rights of the first and second users.

In some embodiments, the access rights for the multi-user working session are a union of the access rights of the first and second users. However, the rules for combining the access rights of the users taking part in the multi-user working session need not necessarily be the union of the individual access rights. Any suitable method of combining access rights may be used. For example, access to a file or another controlled object may be given if and only if all the users taking part in the multi-user working session have suitable access rights, or, stated differently, that the access rights in the multi-user working session are the intersection of the individual access rights of the users taking part in the multi-user working session. As another example, access to a file or another controlled object may be given if and only if the number of users taking part in the multi-user working session which have access rights to the controlled object is equal to or greater than the number of users that do not have access rights to the controlled object. US Patent Application No. 2012/0324550 to Wasilewski, which is hereby incorporated by reference, discloses many ways for combining access rights of multiple users, and any one of those ways may be used when implementing the present invention. It will be appreciated that though the examples provided in the present disclosure assume that the rule for combining the access rights of the users taking part in a multi-user working session is forming a union of the individual access rights of all the participating users, the scope of the present invention is not limited to such a rule, and includes any suitable rule for combining access rights, as described hereinabove and as taught by US Patent Application No. 2012/0324550 to Wasilewski.

When a multi-user working session is established, as shown in step 208, any controlled object that is accessible by at least one of the users taking part in the multi-user working session is accessible from the multi-user working session. In some embodiments, conflicts in the names of directories, files, or other controlled objects may occur in the multi-user working session, for example when two users have, when in single user sessions, the same displayed name for two different controlled resources. In such cases, following initiation of a multi-user working session, displayed name conflicts are resolved, and the controlled objects are displayed in a way that clearly distinguishes the files of different users, as seen at step 209.

For example, John and Peter may each have their own "My Documents" folder, when in a single-user working session. When John and Peter share a multi-user working session, their individual "My Documents" folders will be displayed with two different names, for example "John's My Documents" and "Peter's My Documents", thus clarifying to the users, namely John and Peter, the identities of the folders.

In more formal terms, if a name displayed to the first user for a first controlled object accessible using access rights of the first user in a first single-user working session of the first user is identical to a name displayed to the second user for a second controlled object accessible using access rights of the second user in a second single-user working session of the second user, during the multi-user working session a first name is displayed for the first controlled object and a second name, different from the first name, is displayed for the second controlled object.

In some embodiments, additional users may be added to the multi-user working session, either immediately after its initiation or at any stage during the multi-user working session. In some such embodiments, at step 210, computing system 100a receives an additional command to enable another additional user to interact with the computing system, substantially as described hereinabove with respect to step 204. As seen at step 212, in response to receipt of the additional command, and, where relevant, generation of a prompt for entering user credentials of the additional user, user credentials for the additional user are received, substantially as described hereinabove with respect to step 206. At step 214, the additional user is added to the already active multi-user working session, such that the access rights of the additional user are combined with the access rights already associated with the multi-user working session, in accordance with the applicable access rights combining rule, as described hereinabove.

It will be appreciated that steps 210 to 214 may be repeated as many times as necessary for combining the required access rights, possibly within a predefined limit for the number of participants in a multi-user working session.

It will be appreciated that each time that a user is added to the multi-user working session, additional conflicts to displayed names of controlled objects may occur. As such, the step of resolving displayed name conflicts, described hereinabove with reference to step 209, may be repeated following each addition of a user to the multi-user working session, as seen at step 216, following addition of a group of users to the multi-user working session, or may be carried out only when all participating users have been added to the multi-user working session.

Turning to step 218, it is seen that during the multi-user working session, various controlled objects are accessed, including controlled objects to which only one, or some, of the users participating in the multi-user working session have access rights. Returning to the example above, when John and Peter participate in a multi-user working session, they access files in "John's My Documents" folder as well as files in "Peter's My Documents" folder, even though normally, in a single-user working session, John does not have access rights to files in Peter's "My Documents" folder, and Peter does not have access rights to files in John's "My Documents" folder.

Stated more formally, during the multi-user working session a first controlled object is accessed or used using an access right included in the access rights of the first user and a second controlled object is accessed or used using an access right included in the access rights of the second user, although the access rights of the second user do not allow accessing or using of the first controlled object and the access rights of the first user do not allow accessing or using of the second controlled object.

At some point during the multi-user working session, a logout command is received, as seen at step 220. In response to the logout command, at least one user is logged out of the multi-user working session, in accordance with a logout policy or protocol, as seen at step 222. It will be appreciated by those of skill in the art that various logout policies may be implemented for logging out of, or terminating, the multi-user working session. A few exemplary logout policies or protocols are described hereinbelow, but it will be appreciated that any suitable logout policy or protocol is considered to be within the scope of the present invention.

As a first example, receipt of a logout command may causes the computing system 100a to terminate the multi-user working session. In some cases, termination of the multi-user working session may occur while maintaining the single user working session of the first user, initiated at step 202 described hereinabove, active. In other cases, termination of the multi-user working session also terminates the initial single-user working session.

As another example, which is particularly relevant when the multi-user working session includes three or more participating users, the logout policy may instruct computing system 100a that upon receipt of a logout command, the last user that has joined, or was added to, the multi-user working session, as well as his/her access rights, should be removed from the multi-user working session, while maintaining the multi-user working session active.

In some embodiments, a logout command is received from a specific participating user together with an identification of that user. Also in these embodiments, multiple different logout policies and protocols are envisioned.

As an example, which is particularly relevant when the multi-user working session includes three or more participating users, the logout policy may determine that in response to receipt of a logout command including an identification of the user providing the command, computing system 100a should remove the identified user, and the access rights of the identified user, from the multi-user working session, while maintaining the multi-user working session active. In some such embodiments, removal of the identified user occurs if the identifier is of any user other than the first user who initiated the initial single-user working session (step 202). However, if the first user provides the logout command, the multi-user working session is terminated.

As another example, if the provided identification is an identification of any user other than the first user who initiated the initial single-user working session (step 202), receipt of the logout command results in computing system 100a terminating the multi-user working session and maintaining the initial single-user working session active. However, if the provided identification is an identification of the first user, receipt of the logout command results in computing system 100a terminating the multi-user working session as well as the initial single-user working session.

As yet another example, which is particularly suitable if the multi-user working session includes only two users, if the provided identification is an identification of the second user (added at step 208), receipt of the logout command results in computing system 100*a* terminating the multi-user working session and maintaining the initial single-user working session active. However, if the provided identification is an identification of the first user, receipt of the logout command results in computing system 100*a* terminating the multi-user working session as well as the initial single-user working session, and in initiation of a second single-user working session for the second user.

An example implementation of the method of FIG. 2A is now presented in the context of the Windows® 7 operating system. In that Operating System, when the "Start" menu is activated (by selecting the Windows® logo in the lower left corner of the screen) a "Shut down" button appears on the screen. The button provides a drop-down list, presenting to the user the options of: "Switch user", "Log off", "Lock", "Restart", "Sleep" and "Hibernate".

If during an existing session the user selects "Switch user", a log-in screen is presented, where the credentials of the new user may be entered, causing the current session to be put on hold and become invisible, without being closed or terminated, and a new single-user working session is opened for the newly logged-in user, or, if a session for the newly logged in user was already active and invisible, that session becomes visible.

When implementing the present invention in Windows® 7, the drop-down list provided with the "Shut down" button may include another option, that may be called "Add user", "Join user" or "Invite user". When the user selects this additional option, a log-in screen, similar to that provided in response to a "Switch user" command, may be displayed. After the new user inputs his user credentials into the displayed log-in screen, a multi-user working session, which has as access rights the union of the access rights of the inviting user and the invited user, is created. The user may select "Invite user" again, and a third user may be added to the multi-user working session. This process can be repeated until the number of users participating in the multi-user working session reaches a pre-defined limit, or as often as necessary if no such limit is set.

In some embodiments, in which the log-out policy is that a log-out command received from any user participating in the multi-user working session terminates the multi-user session, then the regular logging out procedure of Windows® 7 will continue to operate as expected, and is compatible with the termination of a multi-user working session, as the operating system does not require an identification of the user logging out. However, if the log-out policy requires identification of the user logging out, for example in order to maintain the multi-user working session active with all the participating users who have not logged out, pressing the log-out button would cause the operating system to present a menu, similar to that provided when logging into the system, at which the user may provide a user identification and/or user credentials in order to enable the operating system to be compatible with the logout policy.

Turning to FIG. 2B, it will be appreciated that the method of FIG. 2B provides an alternative methodology for creating a multi-user working session enabling combining access rights of the users participating in the multi-user session.

Turning to FIG. 2B, it is seen that in a first step, indicated by reference numeral 250, a virtual user is generated in computing system 100*b*, which virtual user combines the access rights of at least a first user and a second user, and in some embodiments more than two users. In some embodiments, creation of the virtual user includes receiving the user credentials of each of the participating users, typically from a user input device 140 associated with a terminal 142. In some embodiments, more than one participating user, or all participating user, provide their user credentials via the same terminal 142 and/or via the same user input device 140. As discussed hereinabove with respect to step 200 of FIG. 2A, in some embodiments terminal 142 and/or user input device 140 are located near the processor 120*b*, and the input user credentials are received directly, whereas in other embodiments the terminal 142 may be networked to processor 120*b*, and the user credentials are received via transceiver 138.

The received user credentials may include a user-name or other user identifier, as well as a mechanism for authenticating the user, such as a password, OTP, biometric data of the user, and the like.

In some embodiments, a single user, such as an administrator, creates the virtual user, and provides the user credentials for all participating users. It will be appreciated that in embodiments involving a virtual user, the method of FIG. 2B requires that each of the participating users trusts all the other participants, not to misuse his/her user credentials and/or access rights, unlike the method of FIG. 2A in which no trust is required as each user may keep his credentials secret and be the only one feeding them into the computing system.

At step 252, the computing system 100*b* assigns user credentials to the virtual user generated in step 250. The user credentials assigned to the virtual user are different from the user credentials of any other user of the computing system, and, specifically, of any user whose access rights form part of the access rights of the virtual user, or any user participating in the virtual user. In some embodiments, the user credentials of the virtual user include at least a username uniquely identifying the virtual user, and a password.

Turning to step 254, it is seen that at some later stage, the user credentials of the virtual user are received, typically from a user input device 140 associated with a terminal 142, substantially as described hereinabove, thereby logging the virtual user into computing system 100*b*. The user credentials of the virtual user are provided by a user who knows these credentials, which, in some embodiments, may be a participant in the virtual user.

Following receipt of the user credentials of the virtual user, at step 256 computing system 100*b* initiates a multi-user working session during which access rights of the virtual user are respected. The access rights of the virtual user include a combination of the access rights of the first and second users, as well as access rights of any other users whose credentials were provided when generating the virtual user.

As described hereinabove with reference to FIG. 2A, in some embodiments, the access rights for the multi-user working session are a union of the access rights of the participating users, although many other combination techniques and methods may be suitable and are considered within the scope of the present invention.

As described hereinabove with reference to FIG. 2A, when a multi-user working session is established, any controlled object that is accessible by at least one of the users taking part in the multi-user working session is accessible from the multi-user working session. In some embodiments, conflicts in the names of directories, files, or other controlled objects may occur in the multi-user working session, for example when two users have, when in single user sessions, the same displayed name for two different controlled resources. In such cases, following initiation of a multi-user working session, displayed name conflicts are resolved, and the controlled objects are displayed in a way that clearly distinguishes the files of different users, as seen at step 258.

Turning to step 260, it is seen that during the multi-user working session, various controlled objects are accessed, including controlled objects to which only one, or some, of the users participating in the multi-user working session have access rights. Returning to the example above, when John and Peter participate in a multi-user working session, they access files in "John's My Documents" folder as well as files in "Peter's My Documents" folder, even though normally, in a single-user working session, John does not have access rights to files in Peter's "My Documents" folder, and Peter does not have access rights to files in John's "My Documents" folder.

Stated more formally, during the multi-user working session a first controlled object is accessed or used using an access right included in the access rights of the first user and a second controlled object is accessed or used using an access right included in the access rights of the second user, although the access rights of the second user do not allow accessing or using of the first controlled object and the access rights of the first user do not allow accessing or using of the second controlled object.

At some point during the multi-user working session, a logout command is received, as seen at step 262. In response to the logout command, the virtual user is logged out from the computing system 100b, as seen at step 264. Unlike the embodiment of FIG. 2A, because the virtual user is considered, by the computing system, as a single user, logging out of a multi-user session of the virtual user completely terminates the multi-user working session. However, in some embodiments, the computing system 100b may consider the virtual user to be a combination of multiple individual users, in which case the logout policy or protocol may be configured, substantially as described hereinabove with respect to FIG. 2A.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for sharing access rights of multiple users in a computing system, each of said multiple users having corresponding user credentials and corresponding access rights to controlled objects in said computing system, the method comprising the following steps, in order:

a. receiving from a first user user-credentials of said first user via a terminal of said computing system, thereby logging said first user into the computing system, wherein said receiving initiates a single-user working session of said first user during which only said first user is allowed to access controlled objects to which said first user has access rights;

b. receiving, during said single-user working session of said first user, a command instructing the computing system to enable an additional user to interact with said computing system, while providing the additional user all the access rights available to said first user and while providing said first user all the access rights available to said additional user;

c. following said receiving of said command, causing presentation of a prompt for entering user credentials of the additional user;

d. in response to said prompt, receiving user-credentials of a second user via said terminal of said computing system;

e. in response to said receiving of said user credentials of said second user, initiating a multi-user working session, embedded within a time period of said single-user working session of said first user, wherein during said multi-user working session said first user and said second user are allowed to access all controlled objects to which said first user has access rights and all controlled objects to which said second user has access rights, said multi-user working session being conducted via said terminal of said computing system; and f. prior to termination of said multi-user working session, accessing a first controlled object using an access right included in said access rights of the first user and accessing a second controlled object using an access right included in said access rights of the second user, wherein said access rights of said second user do not allow accessing of said first controlled object and said access rights of said first user do not allow accessing of said second controlled object, wherein the accessing of the first controlled object and the accessing of the second controlled object occur within said multi-user working session, wherein accessing of a controlled object comprises carrying out at least one operation selected from the group consisting of reading, writing, editing, deleting, printing, scanning, transmitting, and receiving, with respect to the controlled object, and wherein a controlled object comprises an object selected from the group consisting of a file, a folder, a peripheral device, and a computing device.

2. The method of claim 1, wherein said receiving said user-credentials of said first user and said receiving said user credentials of said second user occur via a single user-input device of said terminal.

3. The method of claim 1, further comprising, during said multi-user working session:

receiving, during said multi-user working session, a second command instructing the computing system to enable a second additional user to interact with said computing system, while providing the second additional user all the access rights available to said first and second users and while providing said first and second users all the access rights available to said second additional user;

following said receiving of said second command, causing presentation of a second prompt for entering user credentials of the second additional user;

in response to said second prompt, receiving from a third user user-credentials of said third user via said terminal of said computing system; and in response to said receiving said credentials of said third user, adding to said multi-user working session access rights of said third user, such that, during said multi-user working session, said first, second, and third users are all allowed to access all controlled objects to which said first user has access rights, all controlled objects to which said second user has access rights, and all controlled objects to which said third user has access rights.

4. The method of claim 3, further comprising, during said multi-user working session:

receiving a log-out command including an identification of a specific user included in said multi-user working session; and in response to said receiving said log-out command and said identification of said specific user, removing access rights of said specific user from said multi-user working session, while maintaining said multi-user working session active.

5. The method of claim 1, further comprising, during said multi-user working session:

receiving a log-out command from said first user or from said second user; and following receipt of said log-out command, terminating said multi-user working session.

6. The method of claim 5, further comprising, in addition to said terminating said multi-user working session, also terminating said single-user working session of said first user.

7. The method of claim 5, wherein said log-out command received from said first user or from said second user includes an identification of said first user or of said second user.

8. The method of claim 7, wherein:

in response to receiving, as said identification included in said log-out command, an identification of said second user, said terminating said multi-user working session does not terminate said single-user working session of said first user, such that following said terminating said multi-user working session, said first user is allowed to access controlled objects to which said first user has access rights; and in response to receiving, as said identification included in said log-out command, an identification of said first user, in addition to terminating said multi-user working session, also terminating said single user working session of said first user, such that following said terminating said multi-user working session and said single-user working session of said first user, said first user is not allowed to access controlled objects to which said first user has access rights until said first user starts or joins another working session.

9. The method of claim 7, wherein:

in response to receiving, as said identification included in said log-out command, an identification of said second user, said terminating said multi-user working session does not terminate said single-user working session of said first user, such that following said terminating said multi-user working session, said first user is allowed to access controlled objects to which said first user has access rights; and in response to receiving, as said identification included in said log-out command, an identification of said first user, in addition to terminating said multi-user working session, also terminating said single user working session of said first user, and automatically initiating a second single-user working session of said second user, such that during said second single-user working session of said second user only said second user is allowed to access controlled objects to which said second user has access rights.

10. The method of claim 1, further comprising, during said multi-user working session:

in response to determining that a specific name used to identify a first controlled object to said first user using access rights of said first user in a first single-user working session of said first user, is also used to identify a second controlled object to said second user using access rights of said second user in a second single-user working session of said second user, using a first name to identify said first controlled object to said first and second users during said multi-user working session and using a second name to identify said second controlled object to said first and second users during said multi-user working session, said first and second names being different from each other.

11. A method for sharing access rights of multiple users in a computing system supporting access by a plurality of users each having corresponding user credentials, the method comprising the following steps, in order:

a. receiving, from an administrator of the computing system, a command to define a virtual user that combines all the access rights of a first user of the plurality of users and all the access rights of a second user of the plurality of users, said receiving of said command to define comprising receiving said user-credentials of said first user and of said second user, and assigning to said virtual user unique user credentials different from said user credentials of any user of said plurality of users;

b. receiving from at least one of said first user and said second user, via a terminal of said computing system, said user credentials assigned to said virtual user, thereby logging said virtual user into the computing system;

c. in response to said receiving said user credentials assigned to said virtual user, initiating a multi-user working session including, as participants, said first user and said second user, during which said first user and said second user are allowed access to all controlled objects to which said first user has access rights and to all controlled objects to which said second user has access rights, said multi-user working session being conducted via said terminal of said computing system; and d. prior to termination of said multi-user working session, accessing a first controlled object using an access right included in said access rights of the first user and accessing a second controlled object using an access right included in said access rights of the second user, wherein said access rights of said second user do not allow accessing of said first controlled object and said access rights of said first user do not allow accessing of said second controlled object, wherein the accessing of the first controlled object and the accessing of the second controlled object occur within said multi-user working session, wherein accessing of a controlled object comprises carrying out at least one operation selected from the group consisting of reading, writing, editing, deleting, printing, scanning, transmitting, and receiving, with respect to the controlled object, and wherein a controlled object comprises an object selected from the group consisting of a file, a folder, a peripheral device, and a computing device.

12. The method of claim 11, wherein said virtual user combines the access rights of at least three users, wherein said receiving of said command to define further comprises receiving said user-credentials of a third user of the plurality of users, via said terminal of the computing system, and wherein said initiating comprises initiating said multi-user working session such that said first, second, and third users are allowed access to controlled objects to which said first, second, or third users have access rights.

13. The method of claim 11, further comprising, during said multi-user working session:

in response to determining that a specific name used to identify a first controlled object to said first user using access rights of said first user in a first single-user working session of said first user, is also used to identify a second controlled object to said second user using access rights of said second user in a second single-user working session of said second user, using a first name to identify said first controlled object to said first and second users during said multi-user working session and using a second name to identify said second controlled object to said first and second users during said multi-user working session, said first and second names being different from each other.

14. The method of claim 11, further comprising, during said multi-user working session:

receiving a log-out command from said first user or from said second user; and following receipt of said log-out command, terminating said multi-user working session.

15. A computing system in which access rights of multiple users can be shared, each of said multiple users having corresponding user credentials and corresponding access rights to controlled objects in said computing system, the computing system comprising:

a. a processor; and
b. a non-transitory computer readable storage medium for instructions execution by the processor, the non-transitory computer storage medium having stored instructions to be carried out in order, said instructions including:
  i. instructions to receive from a first user user-credentials of said first user via a terminal of said computing system, thereby to log said first user into the computing system and to initiate a single-user working session of said first user during which only said first user is allowed to access controlled objects to which said first user has access rights;
  ii. instructions to receive, during said single-user working session of said first user, a command instructing the computing system to enable an additional user to interact with said computing system, while providing the additional user all the access rights available to said first user and while providing said first user all the access rights available to said additional user;
  iii. instructions, to be carried out following said receipt of said command, to cause presentation of a prompt for entering user credentials of the additional user;
  iv. instruction to receive, in response to presentation of said prompt, user-credentials of a second user via said terminal of said computing system;
  v. instructions to initiate, in response to receipt of said user credentials of said second user, a multi-user working session embedded within a time period of said single-user working session of said first user, wherein during said multi-user working session said first user and said second user are allowed to access all controlled objects to which said first user has access rights and all controlled objects to which said second user has access rights, said multi-user working session being conducted via said terminal of said computing system; and
  vi. instructions to be carried out during said multi-user working session, to access a first controlled object using an access right included in said access rights of the first user and to access a second controlled object using an access right included in said access rights of the second user, wherein said access rights of said second user do not allow accessing or of said first controlled object and said access rights of said first user do not allow accessing or of said second controlled object, wherein accessing of a controlled object comprises carrying out at least one operation selected from the group consisting of reading, writing, editing, deleting, printing, scanning, transmitting, and receiving, with respect to the controlled object, and wherein a controlled object comprises an object selected from the group consisting of a file, a folder, a peripheral device, and a computing device.

16. The computing system of claim 15, wherein said non-transitory computer readable storage medium further has stored instructions to be carried out during said multi-user working session, said instructions including:

instructions to receive, during said multi-user working session, a second command instructing said computing system to enable a second additional user to interact with said computing system;

instructions, to be carried out following receipt of said second command, to cause presentation of a second prompt for entering user credentials of said second additional user;

instructions to receive, in response to presentation of said second prompt, user-credentials of a third user via said terminal of said computing system; and instructions to add to said multi-user working session, in response to receiving said user credentials of said third user, access rights of said third user, such that during said multi-user working session said first, second, and third users are allowed access to all controlled objects to which said first, second, or third users have access rights.

17. A computing system in which access rights of multiple users can be shared, each of the multiple users being part of a plurality of users each having corresponding user credentials, the computing system comprising:

a. a processor; and
b. a non-transitory computer readable storage medium for instructions execution by the processor, the non-transitory computer storage medium having stored instructions to be carried out in order, said instructions including:
  i. instructions to receive from an administrator of the computing system a command to define a virtual user that combines all the access rights of a first user of the plurality of users and all the access rights of a second user of the plurality of users, the instructions to receive said command comprising instructions to receive said user credentials of said first user and of said second user, and instructions to assign to said virtual user unique user credentials different from said user credentials of any user of said plurality of users;

ii. instructions to receive from at least one of said first user or said second user, via a terminal of said computing system, said user credentials assigned to said virtual user, thereby to log said virtual user into the computing system;

iii. instructions to initiate, in response to receipt of said user credentials assigned to said virtual user, a multi-user working session including, as participants, said first user and said second user, during which said first user and said second user are allowed access to all controlled objects to which said first user has access rights and all controlled objects to which said second user has access rights, said multi-user working session being conducted via said terminal of said computing system; and iv. instructions to be carried out during said multi-user working session, to access or a first controlled object using an access right included in said access rights of the first user and to access a second controlled object using an access right included in said access rights of the second user, wherein said access rights of said second user do not allow accessing of said first controlled object and said access rights of said first user do not allow accessing of said second controlled object wherein accessing of a controlled object comprises carrying out at least one operation selected from the group consisting of reading, writing, editing, deleting, printing, scanning, transmitting, and receiving, with respect to the controlled object, and wherein a controlled object comprises an object selected from the group consisting of a file, a folder, a peripheral device, and a computing device.

* * * * *